Aug. 25, 1931.   L. A. GEBHARD   1,820,018
ELECTRICAL MEASURING SYSTEM
Filed Dec. 22, 1928   2 Sheets-Sheet 1

Inventor
Louis A. Gebhard
By Harold Dodd
Attorney

Aug. 25, 1931. L. A. GEBHARD 1,820,018
ELECTRICAL MEASURING SYSTEM
Filed Dec. 22, 1928 2 Sheets-Sheet 2

Inventor
Louis A. Gebhard
By Harold Dodd
Attorney

Patented Aug. 25, 1931

1,820,018

UNITED STATES PATENT OFFICE

LOUIS A. GEBHARD, OF WASHINGTON, DISTRICT OF COLUMBIA, ASSIGNOR TO WIRED RADIO, INC., OF NEW YORK, N. Y., A CORPORATION OF DELAWARE

ELECTRICAL MEASURING SYSTEM

Application filed December 22, 1928. Serial No. 327,987.

My invention relates to current transformers in general and more specifically to current transformers of the type employed in high frequency signaling systems.

An object of my invention is to provide an efficient current transformer whereby loss of energy is greatly reduced.

Another object of my invention is to provide a current transformer whereby large values of electrical energy may be measured.

Figure 1:
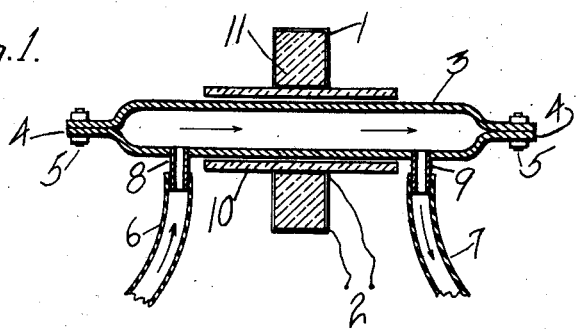
Figure 2:
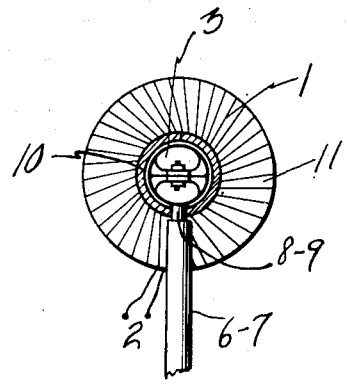
Figure 3:
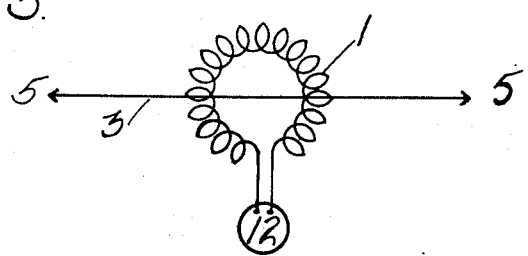
Figure 4:
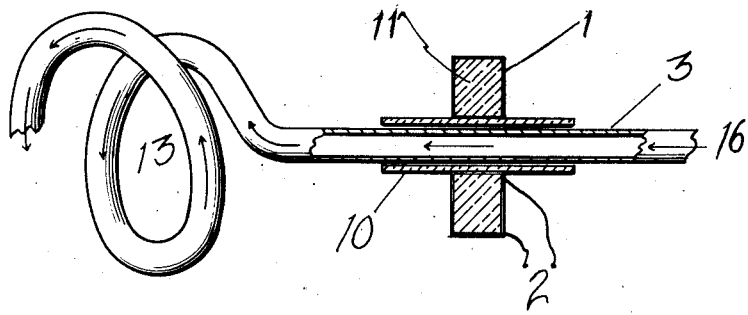
Figure 5:
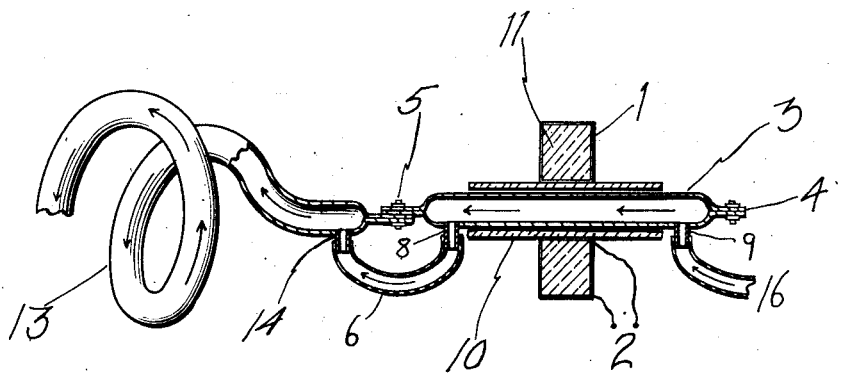

Other and further objects of my invention reside in the construction of the current transformer as set forth in the specification hereinafter following and shown in the accompanying drawings wherein:

Figure 1 shows the current transformer of my invention; Fig. 2 shows another view of the current transformer of my invention; Fig. 3 shows schematically the operation of the current transformer of my invention; Fig. 4 shows a modification of the current transformer of my invention; and Fig. 5 shows a cross-section of the current transformer of my invention.

In high frequency signaling systems and especially in transmitting systems wherein high frequency energy is employed, it is frequently desirable, if not necessary, to determine the current in the different circuits. The usual method employed for measuring the current in such circuits makes use of an instrument or current transformer. The transformer is so designed that when employed in combination with a suitable meter or other indicating device, the actual value of the current in the primary circuit may be determined. This provides a means for measuring large values of current which could not be conveniently measured with an instrument designed to be supplied with the entire actual current in the circuit for which a current reading is desired. Such a transformer usually comprises a primary conductor having a low inductance and a secondary having a relatively high inductance. When the instrument or current transformer is employed with circuits wherein the current is high, it is necessary to employ a primary winding having a low resistance. It is desirable to have a low capacity and at the same time to have a conductor large enough to carry the current. The ability of the conductor to carry high frequency current of high value is largely determined by the surface area of the conductor. In high frequency systems the surface area also plays an important part in determining the frequency systems the surface area also This is especially disadvantageous when extremely high frequencies are employed, as the added capacity of the primary conductor results in lowering the frequency characteristics below the desired frequency response. When a conductor having a small surface area is employed for the primary winding of a current transformer for measuring high values of current, the conductor is heated and a loss of efficiency results. In the current transformer of my invention the foregoing disadvantages are overcome.

One form of the current transformer of my invention is illustrated in Fig. 1 of the accompanying drawings. Fig. 1 is a cross-sectional view showing a primary conductor 3, insulating member 10 and secondary coil form 11 on which the secondary winding 1 is placed. Conductor 3 may be a metal tube having its two ends 4 closed by a terminal 5 which latter also provides means for connecting primary 3 to a source of high frequency energy. Fluid conducting nozzles 8 and 9 are provided attached to conductor 3. A cooling fluid may be caused to circulate to and from conductor 3 by means of fluid conductors 6 and 7 and nozzles 8 and 9. Fluid conductors 6 and 7 may be of insulating rubber tubing or any suitable insulating material. Terminals 2 of secondary winding 1 may be connected to any suitable indicating device responsive to high frequency energy, such as a radio frequency meter. Fig. 2 shows an end view of the current transformer of my invention wherein secondary winding 1 is provided on a form 11 supported on an insulating member 10. Secondary winding 1 is isolated from conductor 3. Conductor 3 is provided with the ends 4 closed and secured by terminal 5. Fluid conductors 6—7 are attached to nozzles 8—9. Secondary terminals 2 may be connected to any radio frequency indicating device. Fig. 3 shows schematically the operation of the current transformer of my invention. Primary conductor 3 is provided with terminals 5 which may be electrically connected in a series or parallel circuit arrangement with the circuit in which the current is to be measured. A suitable coil 1 is provided which may encircle conductor 3 but is physically separated therefrom. An indicating device such as a meter 12 may be electrically connected to coil 1. Coil 1 comprises the secondary winding of the current transformer and conductor 3 comprises the primary.

Fig. 4 shows a modification of the current transformer of my invention. Secondary winding 1 is provided on a coil form 11. Coil form 11 is adjacent to insulating member 10. Insulating member 10 encircles conductor 3. Conductor 3 may be any suitable electrical conductor such as copper tubing. One terminal of a high frequency inductance 13 may be connected with conductor 3 or conductor 3 may be a continuation thereof. A cooling liquid from source 16 may be caused to circulate through conductor 3 and inductance 13. The heat evolved in conductor 3 and inductance 13 is thus carried away by the circulating liquid. Terminals 2 of secondary winding 1 may be connected to any suitable high frequency indicating device. Fig. 5 of the accompanying drawings shows another form of the current transformer of my invention. In this arrangement the primary conductor 3 and secondary coil arrangement 1 corresponds to the arrangement illustrated in Fig. 1. A closed end 4 of primary conductor 3 is electrically connected to high frequency inductance 13. A nozzle 14 is provided on inductance 13 whereby the circulation of cooling fluid may be completed through conductor 3. The complete circulation is by way of nozzle 9, through conductor 3, nozzle 8, fluid conducting member 6, nozzle 14 and inductance 13.

The current transformer of my invention may be employed in many different circuit arrangements. The primary conductor 3 may be directly connected to a water cooled thermionic tube whereby the water circulating to or from the anode of the tube circulates through conductor 3. When the current transformer is employed in this manner the high frequency circuit would be connected with the end 4 of conductor 3 other than the end directly connected to the tube. Conductor 3 is a hollow container and may be of any metal or alloy. In high frequency circuits an iron core is sometimes undesirable. Copper tubing may be employed, the diameter of which would be dependent upon the cooling liquid employed, the circulation capacity necessary and the current in the circuits where the current transformer is to be employed.

I realize that many modifications of the current transformer of my invention are possible and it is to be understood that my invention shall not be restricted by the foregoing specification or by the accompanying drawings but only as defined in the appended claim.

What I claim as new and desire to secure by Letters Patent of the United States is as follows:

In a transformer, a primary conductor consisting of a hollow tube, a toroidal secondary winding surrounding said primary conductor and substantially perpendicular to the axis thereof, an insulating sleeve interposed between said secondary winding and said primary conductor, means for closing the ends of said primary conductor, nozzle members attached to and communicating with the interior of said primary conductor near the respective ends thereof, means for supplying cooling liquid to a nozzle adjacent one end of said primary conductor and means for withdrawing said liquid from a nozzle adjacent the opposite end of said primary conductor.

LOUIS A. GEBHARD.